United States Patent [19]

Casey

[11] 4,398,492

[45] Aug. 16, 1983

[54] APPARATUS FOR APPLYING AN EXTRUDED STRIP TO AN INSIDE TIRE SURFACE

[75] Inventor: William R. Casey, Akron, Ohio

[73] Assignee: The Goodyear Tire & Rubber Company, Akron, Ohio

[21] Appl. No.: 323,935

[22] Filed: Nov. 23, 1981

[51] Int. Cl.³ .................... B60C 21/08; B05B 13/06
[52] U.S. Cl. ............................ 118/105; 118/107; 118/110; 118/119; 118/318; 156/115; 156/244.13; 156/244.24; 156/397; 156/405.1; 156/408; 156/500
[58] Field of Search ............... 156/110 R, 123 R, 115, 156/130, 244.11, 244.13, 244.24, 394 R, 397, 405 R, 408, 500–501, 405.1; 118/105, 107, 110, 318, 317, 119; 152/346–349

[56] References Cited

U.S. PATENT DOCUMENTS

| | | |
|---|---|---|
| 2,808,872 | 10/1957 | Clapp .................................. 156/408 |
| 3,251,722 | 5/1966 | Holman .............................. 156/350 |
| 3,962,987 | 6/1976 | Brandl ................................ 118/318 |
| 4,115,172 | 9/1978 | Baboff et al. ....................... 156/500 |
| 4,262,624 | 4/1981 | Soeda et al. ........................ 156/115 |

Primary Examiner—Edward C. Kimlin
Assistant Examiner—Lois E. Boland
Attorney, Agent, or Firm—Frederick J. Lacher; T. P. Lewandowski

[57] ABSTRACT

Apparatus for gripping a tire bead, moving the tire vertically and axially over an extruder nozzle die to a position within the tire chamber where a continuous extruded strip is applied to an inside surface of the tire as the tire is rotated. The extruded strip may be applied in a plurality of side-by-side turns connected by angular portions provided by axial indexing of the tire in a predetermined amount for a predetermined time. Means are also provided for spreading the tire beads and pressing the strip against the tire surface without interfering with the movement of the tire over and around the extruder nozzle die.

17 Claims, 11 Drawing Figures

APPARATUS FOR APPLYING AN EXTRUDED STRIP TO AN INSIDE TIRE SURFACE

This invention relates generally as indicated to apparatus for applying a layer of extruded material to the inside surface of a tire and especially to apparatus for the application of a puncture sealing composition. Heretofore strips of extruded material have been applied to the inside surface of a tire; however, the placing of the tire around the extruder nozzle has been done manually so that the quality of the tire after application of the sealant layer and the time required to apply the layer has been dependent on the skill and speed of the operator. In view of the requirement for consistent high standards of production, there has been a need for automatic apparatus capable of applying a puncture sealing layer in accordance with precise specifications and at a speed consistent with normal tire production standards.

It is, therefore, an object of this invention to provide automatic apparatus for not only moving the tire into position with the extruder nozzle inside the tire but to control the placing a plurality of extruded strip turns on the inside of the tire with precision.

It is a further object to roll the extruded strip against the inside tire surface to compress and adhere it to the tire surface.

It is a still further object to provide for applying the extruded strip in several turns with indexing from one turn to the next so as to provide a balanced tire.

Therefore in accordance with one aspect of the invention there is provided apparatus for applying a layer of extruded material to an inside surface of a tire from an extruder having an extruder die for extruding a strip of material comprising means for gripping the tire, tire positioning means for moving the gripped tire into an operating position with the die in close proximity to the inside surface of the tire, means for rotating the tire to lay a strip of the material on the inside surface in one turn as it is extruded from the die, means for providing axial movement of the tire relative to the extruder die to lay additional turns of the strip in side-by-side relationship around the inside surface to form the layer of extruded material and said tire positioning means being reversible for moving the tire away from the extruder die so that the finished tire can be released and removed from the apparatus.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the invention may be employed.

Figure 1:
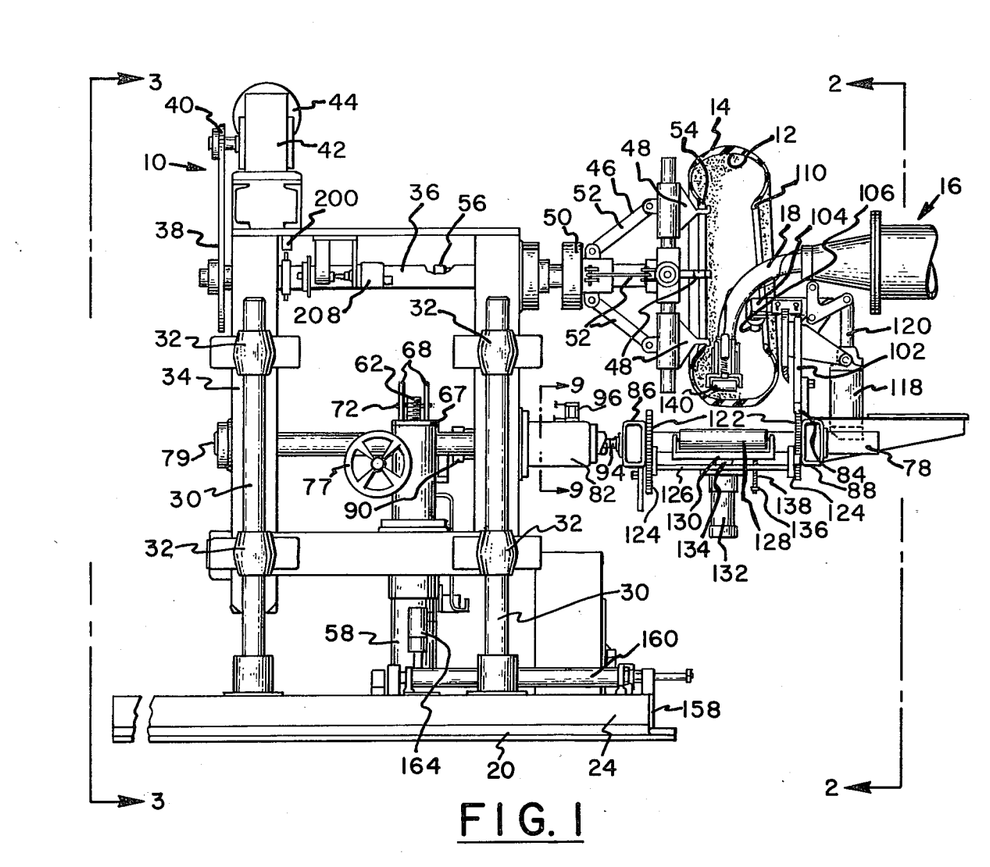
FIG. 1 is a side elevation of the apparatus embodying the invention illustrating its relation to the extruder and extruder goose neck nozzle die with the tire beads spread but before raising of the backup roll and starting of the extruder, parts being broken away to show the tire chuck cylinder and the backup roll, the tire being shown in section to show the extruder nozzle and application roll.
Figure 2:
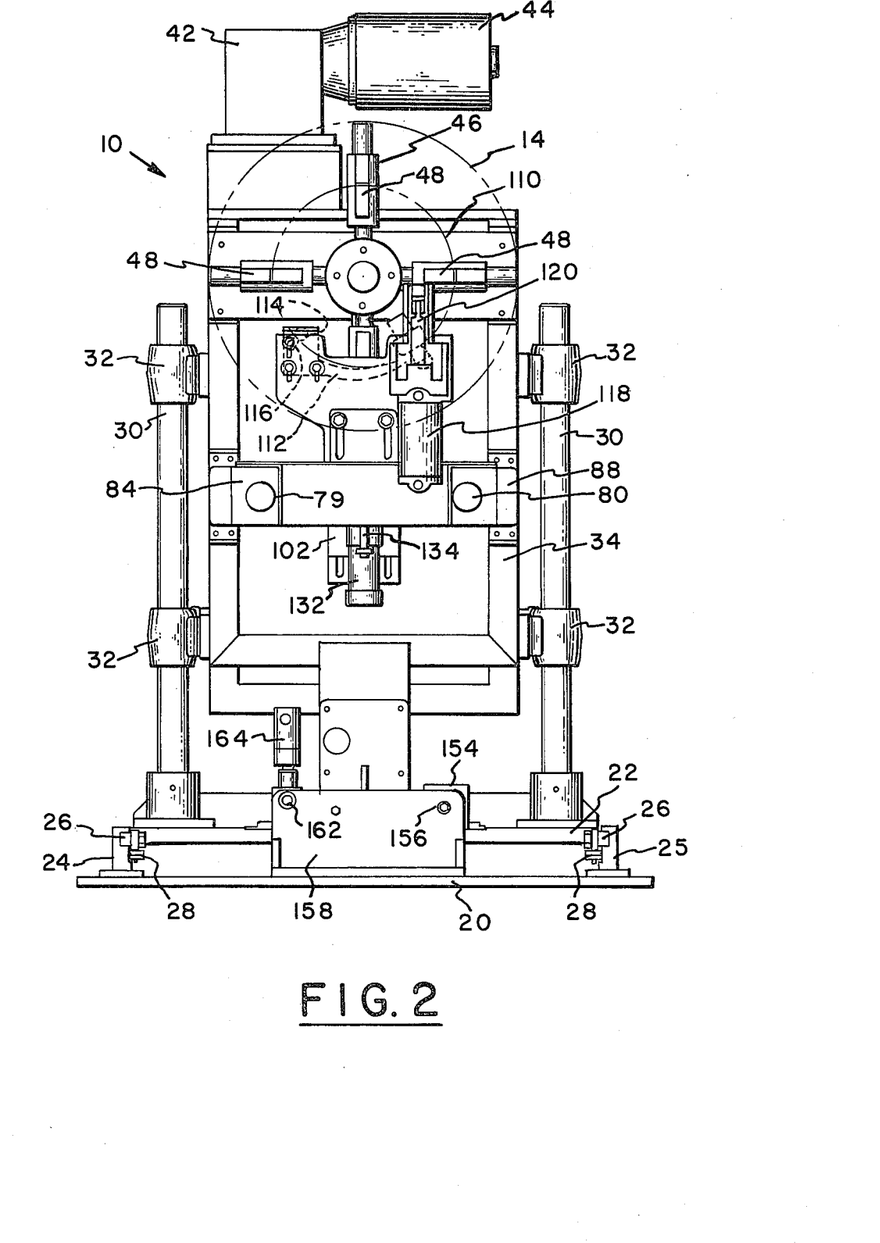
FIG. 2 is a front elevation taken along the lines 2—2 of FIG. 1 with the tire shown in phantom lines.
Figure 3:
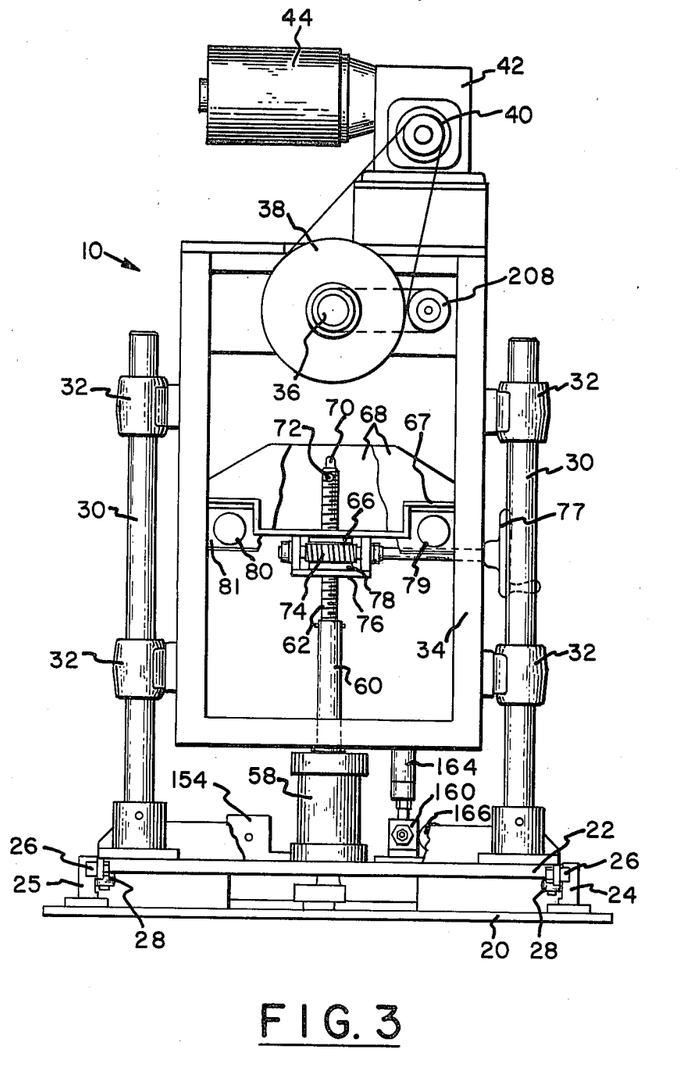
FIG. 3 is a rear elevation taken along the line 3—3 in FIG. 1 with parts being broken away to show the location of the spindle raising cylinder, the indexing cylinder and the check cylinder.

Referring to FIGS. 1, 2 and 3, apparatus such as strip applying machine 10 is shown for applying a layer of extruded material to an inside surface 12 of a tire 14 from an extruder 16 which has a stationary goose neck nozzle die 18. The strip applying machine 10 has a base 20 which may be of steel plate for fastening to a floor. A carriage 22 is supported by rails 24 and 25 mounted on the base 20 for movement of the carriage axially of the tire 14 towards and away from the extruder 16. The carriage 22 has bearings 26 and yoke rollers 28 for engagement with the rails 24 and 25. Mounted on the carriage 22 are vertical shafts 30 in slidable engagement with pillow blocks 32 fastened to members of a main frame 34.

The main frame 34 has bearings for rotatably supporting a spindle 36 having a sprocket 38 connected to a sprocket 40 of a speed reducer 42 and motor 44 which are also mounted on the main frame. A tire chuck 46 is mounted on the spindle 36 between the main frame 34 and the extruder 16. The tire chuck 46 has radially movable bead engaging fingers 48 connected to a sleeve 50 by links 52 for moving the fingers radially into and out of engagement with an inner bead 54 of the tire 14 upon axial movement of the sleeve on the spindle. A tire chuck cylinder 56 has a piston connected to the sleeve 50 and is in communication with an air pressure system for moving the piston in the cylinder toward and away from the tire chuck 46 to expand and contract the fingers 48.

Figure 5:
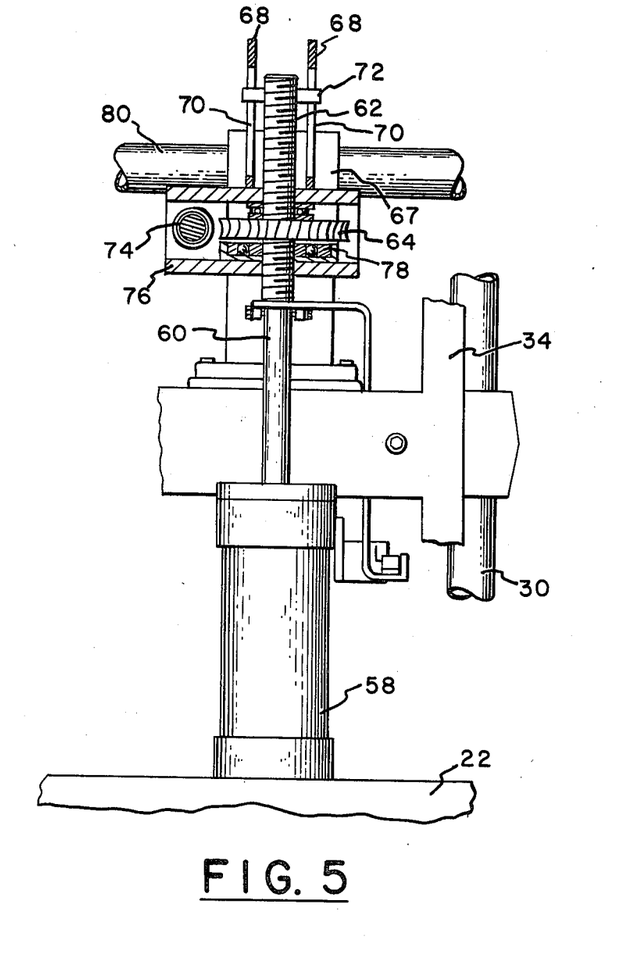
FIG. 5 is an enlarged fragmentary view showing the spindle raising cylinder and the main frame height adjusting mechanism.

Vertical movement of the main frame 34 relative to the carriage 22 is provided by a spindle raising cylinder 58 having a piston rod 60 with the cylinder seated on the carriage 22 and the piston rod having an extension screw 62 in threaded engagement with a worm gear 64 in supporting relationship through a bearing 66 with a beam 67 having a pair of spaced-apart reinforcing flanges 68 between which the screw extends. As shown more clearly in FIGS. 3 and 5, each of the flanges 68 has a slot 70 for receiving a pin 72 extending through the screw 62 to prevent turning while at the same time permitting vertical movement relative to the flanges. A worm 74 supported in a housing 76 is connected by a shaft to a handwheel 77 for turning the worm and thereby rotating the worm gear 64 which is threaded on the extension screw 62 to raise or lower the beam 67 and therefore the main frame 34 and spindle 36. A bearing 78 may also be provided between the housing 76 and the worm gear 64. In this way when air under pressure is introduced into the spindle raising cylinder 58 and the piston rod 60 raised to the uppermost position, the spindle 36 will be raised to the desired position for the size tire which is to be processed.

A pair of horizontal shafts 79 and 80 are mounted on a rear member 81 of the main frame 34 and on a main frame front extension 82 providing a support for a secondary frame 84. Lateral box beams 86 and 88 of the secondary frame 84 contain sleeves slidingly mounted on the shafts 79 and 80 for movement axially of the spindle 36 and tire 14. Movement of the secondary frame 84 is provided by tire spreading cylinder 90 mounted on the main frame 34 and having a piston rod extending through the front extension 82 and connected to the lateral box beam 86. The tire spreading cylinder 90 is a double-acting air cylinder which can be actuated to move the secondary frame 84 toward the main frame 34 until the lateral box beam 86 engages the front extension 82. The tire spreading cylinder 90 can be actuated in the other direction moving the secondary frame 84 away from the main frame 34 until a stop 92 threaded on a threaded stop rod 94 attached to the lateral box beam 86 engages the front extension 82 as shown in FIG. 10.

Figure 9:
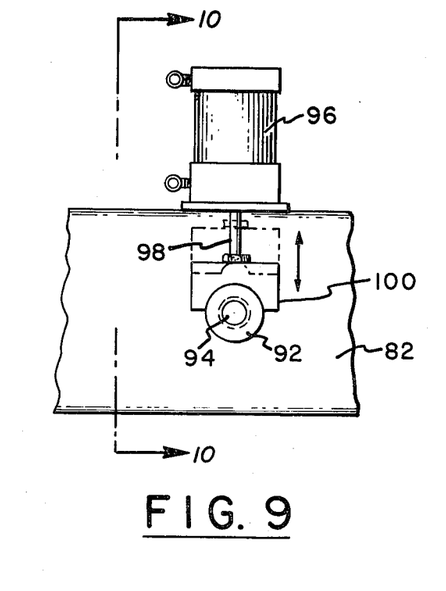
FIG. 9 is an enlarged fragmentary view showing the blocking cylinder with the channel-shaped movement limiting block in position to limit the initial movement of the secondary frame towards the extruder. The U-shaped limiting block is shown in full lines in position for blocking movement and in dotted lines in position for releasing the movement of the secondary cylinder.
Figure 10:
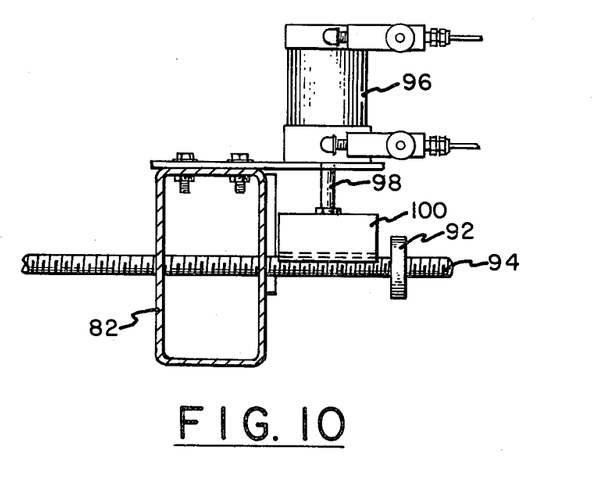
FIG. 10 is a fragmentary sectional view taken along the line 10—10 in FIG. 9.

Referring further to FIGS. 9 and 10, a blocking cylinder 96 is mounted on the front extension 82 and has a piston rod 98 carrying a U-shaped stop block 100 to limit the initial spreading movement of the secondary frame 84 away from the main frame 34 which is sometimes necessary to prevent interference between the secondary frame and larger tires during the time the bead 54 is hung on the fingers 48 of the tire chuck 46 and the fingers are expanded. When the blocking cylinder 96 is actuated air is admitted into the cylinder at one end and the stop block 100 is moved into engagement with the threaded stop rod 94. After the inner bead 54 of the tire 14 is gripped by the tire chuck 46, air is admitted into the other end of the blocking cylinder 96 and the stop block 100 is moved away from the stop rod 94 after which the spreading cylinder 90 can move the secondary frame 84 an additional amount away from the main frame 34 until the stop 92 engages the front extension 82.

Figure 7:
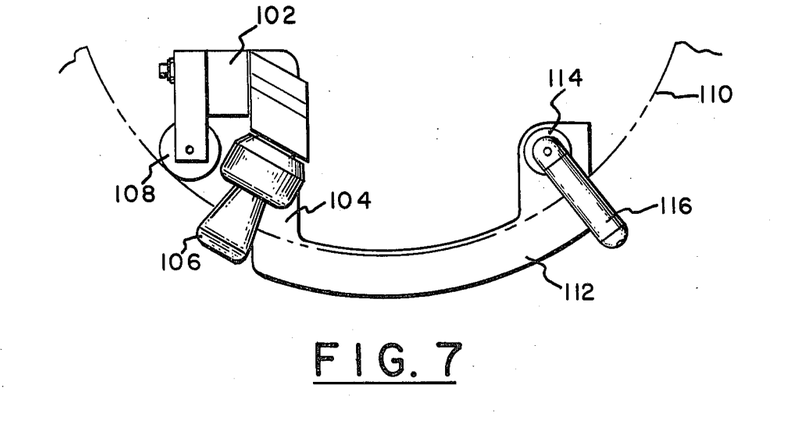
FIG. 7 is an enlarged fragmentary view showing the spreader arm and rollers with relation to the tire bead which is shown in phantom lines.

Mounted on the secondary frame 84 is a spreader frame 102 shown in FIGS. 1, 2 and 7. A spreader arm 104 is pivotally mounted on the spreader frame 102 and carries a spreader roller 106 adjacent a hold-down roller 108 at one end. Extending circumferentially of a second tire bead 110, shown in phantom lines in FIGS. 2 and 7 and in full lines in FIG. 1, is a circumferentially extending link 112 at the end of which is mounted a hold-down roller 114 and a spreader finger roll 116. With this arrangement, upon actuation of a spreader cylinder 118 the spreader arm 104 can be swung into position with the hold-down rollers 108 and 114 and the spreader roller 106 and finger roll 116 in engagement with the second tire bead 110. In this position clearance is provided for movement of the nozzle die 18 over the spreader arm 104 and into the space within the tire 14. The spreader cylinder 118 is air actuated and has a piston rod 120 connected with suitable linkage for swinging the spreader arm 104 into and out of engagement with the second tire bead 110. As shown in FIG. 1, the spreader frame 102 may be vertically adjustable on the secondary frame 84 by racks 122 on the spreader frame which are engageable by gears 124 mounted on a shaft 126 which is rotatable for lifting or lowering the spreader frame.

Also mounted on the secondary frame 84 is a backup roll 128 rotatably mounted on a yoke 130 which is movable vertically upon actuation of a backup roll cylinder 132 having a piston rod 134 attached to the yoke 130. Upward movement of the backup roll 128 is limited by a stop collar 136 threaded on a movement limiting rod 138 connected to the yoke 130 and extending through a member of the secondary frame 84 so that upon upward movement of the backup roll to the desired elevation the stop collar will engage the secondary frame.

Figure 8:
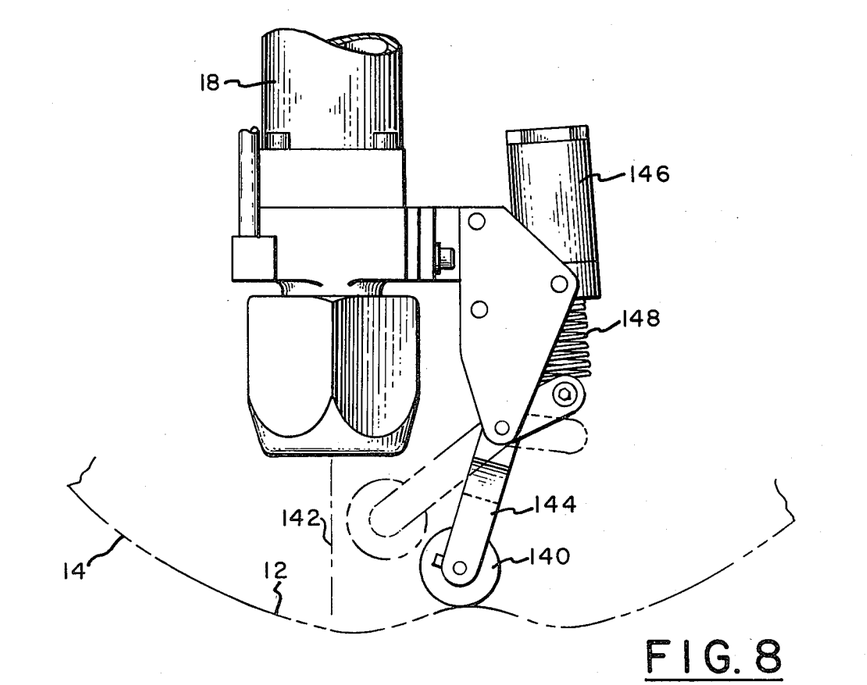
FIG. 8 is an enlarged fragmentary view of the extruder goose neck nozzle die on which is mounted the strip application roll showing the relation of the roll to the inside surface of the tire which is shown in phantom lines. The application roll is shown in the operating position in full lines and in the retracted position in dotted lines.

Referring to FIG. 8, a strip application roll 140 is mounted on the goose neck nozzle die 18 of the extruder 16 for movement from a retracted position shown in dotted lines to a working position shown in full lines for engagement with the strip extruded out of the extruder nozzle die and laid on the inside surface 12 of the tire 14 shown in chain-dotted lines in FIG. 8. Preferably, the application roll 140 is mounted so that pressure is applied to the strip after the strip engages the inside surface 12 of the tire 14 and is moved away from the centerline 142 of the nozzle die 18. The application roll 140 may be mounted on a bell crank 144 actuated by a piston in an application roll cylinder 146 under air pressure of from 40 to 50 psi for pressing the roll against the extruded strip. A resilient means such as coil spring 148 may be interposed between the bell crank 144 and cylinder 146 to urge the application roll 140 into the retracted position when air pressure is released from the cylinder 146. The pressure exerted by the application roll 140 on the strip may be raised or lowered depending upon the strip material. The application roll 140 may also be of a silicone rubber base material which does not adhere to the extruded material.

Figure 4:
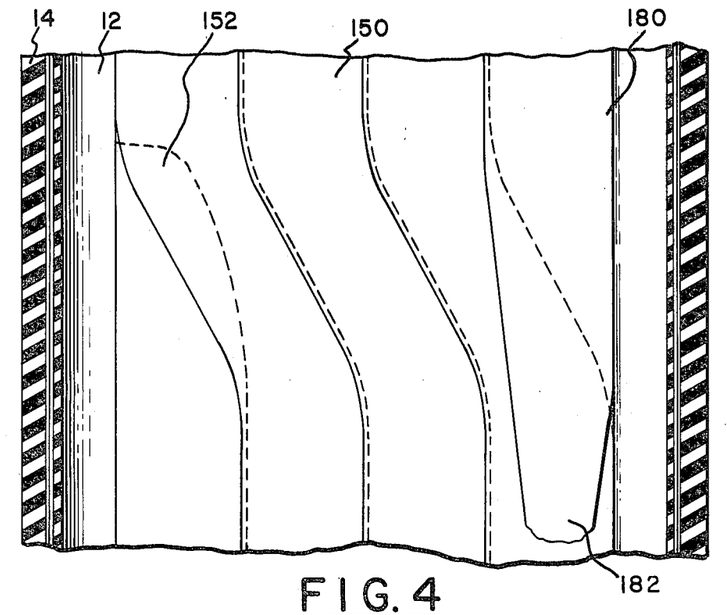
FIG. 4 is an enlarged fragmentary view of the inside of the tire showing the application of the extruded strip turns of puncture sealant material.

Referring to FIG. 4, the inside surface 12 of the tire 14 is shown with a strip 150 of sealant material adhered to the inside surface 12. The sealant strip and tire construction is described in more detail in concurrently filed patent application Ser. No. 323,934 on "Tire and Method of Applying Sealant". With this apparatus, the strip 150 may be applied at a starting point 152 and after one turn of the strip is applied during one revolution of the spindle 36 the spindle is moved axially to a second position for applying a second turn of the strip. Axial movement may be provided by an indexing cylinder 154 having a piston rod 156 connected to an anchor 158 mounted on the base 20 for moving the carriage 22 on which the main frame 34 and spindle 36 are supported.

Figure 6:
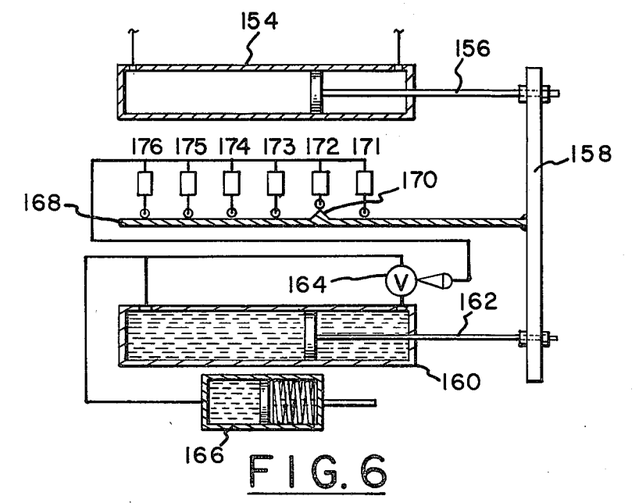
FIG. 6 is a diagramatic view showing the indexing cylinder and the hydraulic check cylinder with the cam and limit switches for indexing the spindle during the application of the sealant strip.

Control of the indexing movement is provided by a hydraulic check cylinder 160 connected to the anchor 158 by a piston rod 162. Flow of the hydraulic fluid from one end of the cylinder 160 to the other end is controlled by solenoid valve 164. An accumulator 166 may be provided in the hydraulic circuit to maintain the pressure and absorb shocks. As shown schematically in FIG. 6, a cam 168 mounted on the base 20 has a cam projection 170 for engagement with limit switches 171 through 176 adjustably mounted on the carriage 22 for actuating the solenoid valve 164 when the spindle 36 has been moved axially the desired distance for laying another turn of the sealant strip 150 on the inside surface 12 of the tire 14. A limit switch 178 is also engageable with the cam projection 170 for the maximum application. As shown in FIG. 4, after the turns of sealant strip 150 have been applied across the inside surface 12 of the tire 14 and the last turn reaches an end point 180, the extruder 16 may be stopped while the rotation of the tire spindle 36 is continued to provide a tapered end 182 of the sealant strip 150.

Figure 11:
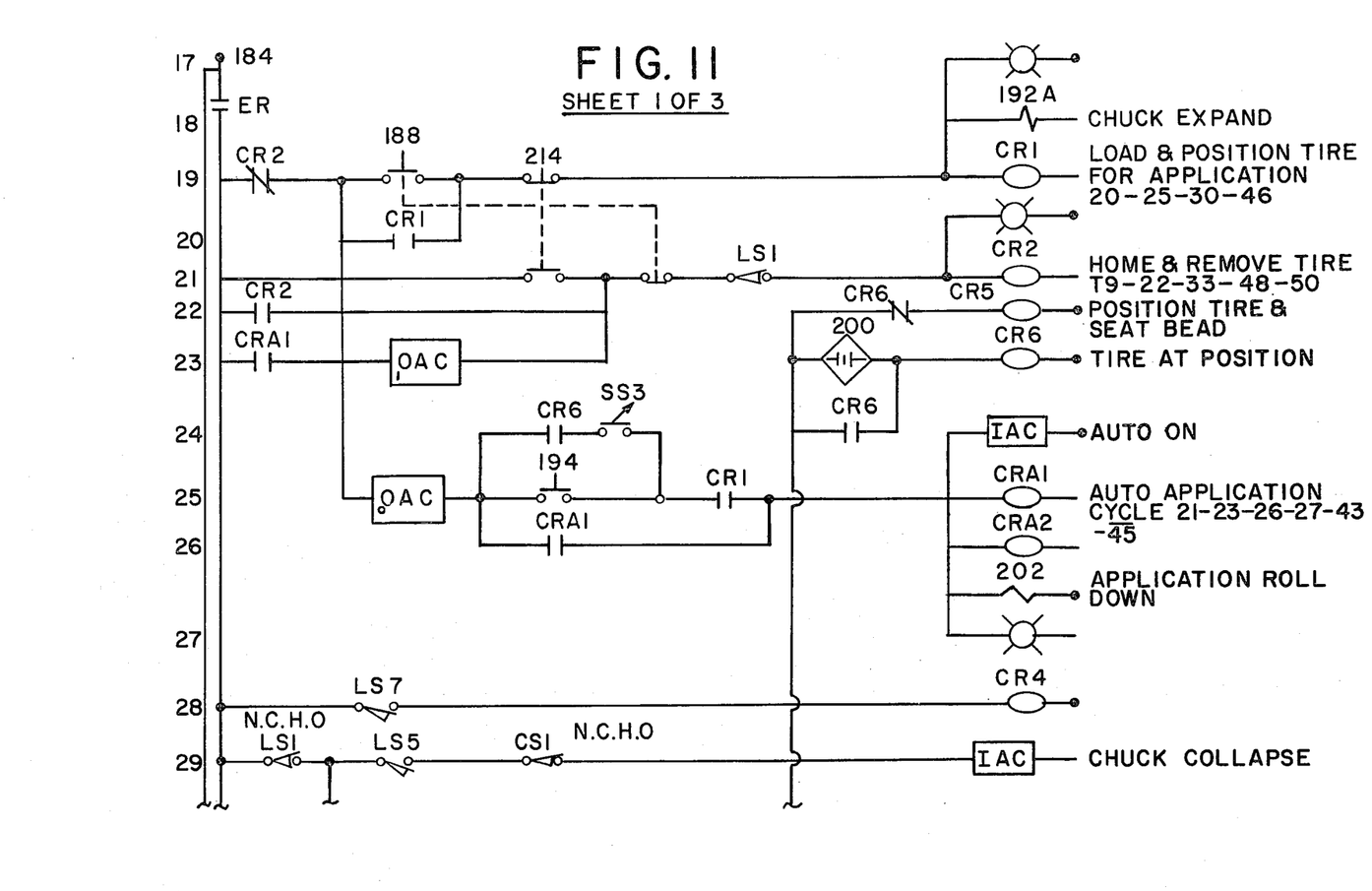
FIG. 11 is a schematic wiring diagram illustrating the electrical controls of the present invention.

Referring now to FIG. 11, it will be seen that the application of the sealant strip 150 by the apparatus can be accomplished completely automatically by the illustrated control circuit. The schematic circuit illustrated in FIG. 11 comprises circuit means 184 and return circuits providing 120 volt, 60 hertz single phase direct current to the control circuit including a microprocessor 187.

Another circuit (not shown) provides power to the ½ horsepower direct current electric motor 44 and the motor controls for rotating the spindle 36. Still another circuit (not shown) is provided for the extruder 16 and the extruder controls. Speed of the motor 44 for rotating the spindle 36 is controlled by a manual setting of a potentiometer (not shown) in a control cabinet. The spindle 36 can also be rotated in predetermined increments by a push button or by automatic controls.

Referring again to FIG. 11, the operation of the apparatus by the electromechanical controls and microprocessor is in accordance with the following procedure: Starting with the machine 10 in a home position the inner bead 54 of the tire 14 is placed on the fingers 48 of the tire chuck 46. Push button switch 188 shown on schematic control panel 190 is pressed to energize solenoid valve 192A for operating the valve to supply air to tire chuck cylinder 56 urging the sleeve 50 to the right to expand the fingers 48 into engagement with the bead 54 of the tire 14.

Push button 194 is then pressed to start the automatic cycle as follows. Solenoid valve 196A is energized for operating the valve which supplies air to the spreader arm cylinder 118 so that the spreader arm 104 will swing the spreader roller 106 and finger roll 116 into engagement with the second bead 110 of the tire 14. A solenoid 198A is then energized for operating the valve which supplies air to the tire spreading cylinder 90 causing the secondary frame 84 to move away from the main frame 34 and spread the tire 14.

During the movement of the secondary frame 84 by the tire spreading cylinder 90 the solenoid 199A is energized for supplying air to the blocking cylinder 96 and moving the stop block 100 downward into position to limit the movement of the secondary frame 84. When the inner bead 54 of the tire 14 is gripped by the tire chuck 46 the solenoid valve 199B is energized to supply air to the blocking cylinder 96 to raise the stop block 100 and permit additional movement of the secondary frame 84. The spindle 36 is rotated to the desired tire position by the spindle spot proximity switch 200 mounted on the main frame 34. The application roll 140 is moved downward relative to the extruder nozzle 18 on which it is mounted by energizing the solenoid 202 for operating the valve which supplies air to the application roll cylinder 146. Solenoid 204 is then energized for operating the valve which supplies air to the spindle raising cylinder 58 causing the main frame 34 to be lifted to a position where the extruder goose neck die 18 is positioned adjacent the inside surface 12 of the tire 14. Simultaneously a solenoid 206 may be energized for operating the valve which supplies air to the backup roll cylinder 132 causing movement of the roll 128 upwards into engagement with the tire 14 for flattening the inside surface 12.

The above procedure places the tire 14 and tire supporting apparatus in position for applying the sealant strip 150 extruded from the extruder die 18. A microprocessor 187 is provided for controlling the application of the sealant strip 150. A pulse generator 208 connected to the spindle 36 operates with the microprocessor 187 to coordinate spindle rotation with sealant application. For example, the extruder 16 is started by the microprocessor 187 to apply sealant. After each revolution of the spindle 36 the solenoid valve 210A is energized to supply air to the indexing cylinder 154 for moving the tire spindle 36 laterally toward the extruder 16 as determined by the pulse generator 208. The lateral movement at the end of each revolution of the tire spindle 36 is controlled by suitable means such as limit switches 171, 172, 173, 174, 175 and 176 mounted on the carriage 22 and engageable with the cam projection 170 to energize solenoid 164. A limit switch 178 is also provided for de-energizing solenoid 164 permitting movement of the apparatus to the home position. The increments of lateral movement of the main frame 34 toward the extruder 16 are according to the specifications for the puncture sealing layer. Switch 212 manually determines whether the sealant should be continued to be applied or the apparatus should be returned to the home position before the cycle is completed.

To provide the desired application of the sealant strip 150 the input to the microprocessor 187 includes the length of leader runout or rotation of the spindle 36 before the sealant strip is applied at the starting point 152 on the inside surface 12 of the tire 14. Referring to FIG. 4, the length of the leader runout can be measured by the pulse generator 208. Also the input includes the number of turns less the last turn which is controlled separately from the others. Input is also required for the last turn to stop the extruder 16 at the end point 180 of about 360 degrees and then continue the rotation of the spindle 36 for a predetermined period of time such as three seconds.

Upon completion of the application of sealant strip 150 the components of the machine are returned to the home position by reversing the electromechanical procedure described above for mounting and positioning the tire 14 with the extruder die 18 adjacent the inside surface 12 of the tire. This reverse procedure can be actuated by actuating the push button switch 214 or automatically by the microprocessor 187. After the reverse procedure is started the order in which the components are moved is determined electromechanically by limit switches and previously described controls. Limit switches are designated by "LS" placed in the schematic circuit shown in FIG. 11. Control relays are designated by the letters "CR", control switches by "CS", and input and output modules energized by the microprocessor by "IAC" and "OAC", respectively. "ER" is a designation for a power relay contact. Solenoids which control air supply to the different air cylinders for returning the apparatus to the home position have the same number with the suffix "B" substituted for the suffix "A" as the solenoids for placing the tire in position.

With the adjustable mounting of the limit switches 171 through 176, the axial indexing movement may be changed to apply more or fewer turns of the strip 30 at the same or different axial locations on the inside surface 12 of the tire 14. When the turns are applied at different axial locations the die opening in the nozzle die 18 can be changed to provide the desired width of the strip of sealant material 150 and therefore the desired overlapping of the adjacent edges of the strip.

While a certain representative embodiment and details have been shown for the purpose of illustrating the invention, it will be apparent to those skilled in the art that various changes and modifications may be made therein without departing from the spirit or scope of the invention.

What is claimed is:

1. Apparatus for applying a layer of extruded material to an inside surface of a tire from an extruder having a stationary extruder die for extruding a strip of said material comprising means for gripping a first bead portion of said tire, tire positioning means for moving the gripped tire into an operating position with said extruder die in close proximity to said inside surface of said tire, means for rotating said tire to lay said strip of said material on said inside surface in one turn as it is extruded from said extruder die, means for providing axial movement of said tire relative to said extruder die to lay additional turns of said strip in side-by-side relationship around said inside surface to form said layer or extruded material and said tire positioning means being reversible for moving the tire away from said extruder die so that the finished tire can be released and removed from the apparatus.

2. Apparatus in accordance with claim 1 wherein a strip application roll is swingably mounted on said extruder die for pressing said strip against said inside surface of the tire during rotation of said tire.

3. Apparatus in accordance with claim 2 wherein said strip application roll engages the strip at a position on the strip after the strip engages the inside surface of the tire and is moved away from the centerline of the extruder die.

4. Apparatus in accordance with claim 2 wherein spring means urges said strip application roll toward said extruder die and air pressure means urges said strip application roll against said strip.

5. Apparatus in accordance with claim 1 wherein a backup roll is positioned for engagement with the outside surface of said tire in the proximity of said extruder die for flattening the inside surface to facilitate application of said strip.

6. Apparatus in accordance with claim 1 including bead spreading means having spaced spreader roll means mounted on a circumferentially extending link, said circumferentially extending link being swingably mounted on a spreader frame for moving said spaced spreader roll means into engagement with a second bead portion of said tire and means for moving said spreader frame away from said first bead portion of said tire to spread the tire.

7. Apparatus in accordance with claim 6 wherein said circumferentially extending link has a pivotal mounting to said spreader frame at one end and has a hold-down roller and a spreading finger roll mounted at the other end, a spreader roller mounted on said circumferentially extending link adjacent said pivotal mounting and a second hold-down roller mounted adjacent said pivotal mounting for engagement with said second tire bead portion.

8. Apparatus in accordance with claim 1 wherein said tire positioning means further comprises a main frame for supporting a spindle on which a tire chuck is mounted for gripping said first bead portion of said tire, said main frame being vertically movable and mounted on an axially movable carriage for moving said spindle axially so that said tire may be moved axially and vertically into said operating position with said extruder die in close proximity to said inside surface of said tire.

9. Apparatus in accordance with claim 8 wherein said axially movable carriage is movable along rail members mounted on a base member.

10. Apparatus in accordance with claim 1 wherein said tire positioning means and said means for providing axial movement of said tire relative to said extruder die comprises piston and cylinder mechanisms actuated by air pressure.

11. Apparatus in accordance with claim 10 wherein indexing of axial movement of said tire relative to said extruder die is controlled by a hydraulic check cylinder having a flow control valve limiting the movement of the check cylinder piston rod at predetermined positions.

12. Apparatus in accordance with claim 11 wherein said flow control valve is responsive to spaced-apart limit switches mounted on an axially movable carriage and engageable with a cam projection connected to a stationary base member.

13. Apparatus in accordance with claim 7 wherein said spreader frame is mounted on a secondary frame axially movable relative to said main frame by a tire spreading piston and cylinder assembly.

14. Apparatus in accordance with claim 13 including blocking means for limiting movement of said secondary frame toward said extruder during gripping of said first tire bead portion.

15. Apparatus in accordance with claim 14 wherein said blocking means is removed after said first tire bead portion is gripped and said tire spreading piston and cylinder assembly is further actuated to move said spreader frame toward said extruder.

16. Apparatus in accordance with claim 13 wherein a backup roller is mounted on said secondary frame and actuated by a backup roll cylinder to flatten said tire at the portion of said inside surface where said strip is applied.

17. Apparatus in accordance with claim 1 wherein said means for gripping a first bead portion of said tire includes a tire chuck having circumferentially spaced bead gripping fingers slidably mounted on radial shafts and connected to an axially movable sleeve by hinged links and actuated by a tire chuck cylinder for axial movement of said sleeve to radially expand or contract said chuck fingers.

* * * * *